(12) United States Patent
Rose et al.

(10) Patent No.: US 10,327,457 B2
(45) Date of Patent: Jun. 25, 2019

(54) METHOD FOR PRODUCING MEAT SUBSTITUTE PRODUCTS

(71) Applicant: ROVITA GMBH, Engelsberg (DE)

(72) Inventors: Mehran Rose, Hohenbrunn (DE); Andreas Gebhart, Muhldorf am Inn (DE); Wolfgang Moser, Engelsberg (DE)

(73) Assignee: ROVITA GMBH, Engelsberg (DE)

( * ) Notice: Subject to any disclaimer, the term of this patent is extended or adjusted under 35 U.S.C. 154(b) by 263 days.

(21) Appl. No.: 14/762,134

(22) PCT Filed: Nov. 13, 2013

(86) PCT No.: PCT/EP2013/003420
§ 371 (c)(1),
(2) Date: Jul. 20, 2015

(87) PCT Pub. No.: WO2014/111103
PCT Pub. Date: Jul. 24, 2014

(65) Prior Publication Data
US 2015/0351427 A1    Dec. 10, 2015

(30) Foreign Application Priority Data
Jan. 21, 2013  (DE) .................. 10 2013 000 955

(51) Int. Cl.
*A23J 3/10*    (2006.01)
*A23J 3/14*    (2006.01)
(Continued)

(52) U.S. Cl.
CPC .................. *A23J 3/227* (2013.01); *A23J 3/10* (2013.01); *A23J 3/14* (2013.01); *A23J 3/22* (2013.01);
(Continued)

(58) Field of Classification Search
CPC ........ A23J 3/10; A23J 3/14; A23J 3/22; A23J 3/227; A23L 13/43; A23L 13/422; A23L 13/426; A23V 2002/00
(Continued)

(56) References Cited

FOREIGN PATENT DOCUMENTS

| EP | 0225770 | 6/1987 |
|---|---|---|
| EP | 1588626 | 10/2005 |

(Continued)

OTHER PUBLICATIONS

McMahon et al. In P.L.H. McSweeney and P.F. Fox (eds.), Advanced Dairy Chemistry: vol. 1A: Proteins: Basic Aspects, 185 4th Edition, DOI 10.1007/978-1-4614-4714-6_6, © Springer Science+Business Media New York 2013, p. 185.*

(Continued)

*Primary Examiner* — Subbalakshmi Prakash
(74) *Attorney, Agent, or Firm* — Viksnins Harris Padys Malen LLP

(57) ABSTRACT

The invention relates to a method for producing meat substitute products, wherein a mixture of water and a vegetable fat/oil comprising a protein, sodium alginate and methylcellulose is processed by shearing/stirring to produce a stable emulsion, and a colloidal solution of divalent metal cations and micellar casein is added to the emulsion for initiating a fiber formation, wherein the quantity of divalent metal cations is selected such that it leads to the initiation of the fiber formation in combination with the micellar casein.

7 Claims, 1 Drawing Sheet

(51) Int. Cl.
*A23J 3/22* (2006.01)
*A23L 13/40* (2016.01)

(52) U.S. Cl.
CPC .......... *A23L 13/422* (2016.08); *A23L 13/426* (2016.08); *A23L 13/43* (2016.08); *A23V 2002/00* (2013.01)

(58) Field of Classification Search
USPC ........................................................ 426/574
See application file for complete search history.

(56) References Cited

FOREIGN PATENT DOCUMENTS

| EP | 1467628 B1 | | 4/2006 | |
|----|----|----|----|----|
| EP | 1790233 | | 5/2007 | |
| NL | 1008364 C2 | * | 8/1999 | ................ A23J 3/14 |
| WO | WO 03061400 A1 | * | 7/2003 | ................ A23J 3/08 |
| WO | WO 2006009426 A1 | * | 1/2006 | .............. A23J 3/227 |

OTHER PUBLICATIONS

Zhu et al. Journal of Dairy Science 78(8): 1665-1672, abstract.*
International Preliminary Report on Patentability in PCT/EP2013/003420, dated Jul. 21, 2015.
International Search Report in PCT/EP2013/0034201, dated Aug. 26, 2014.

* cited by examiner

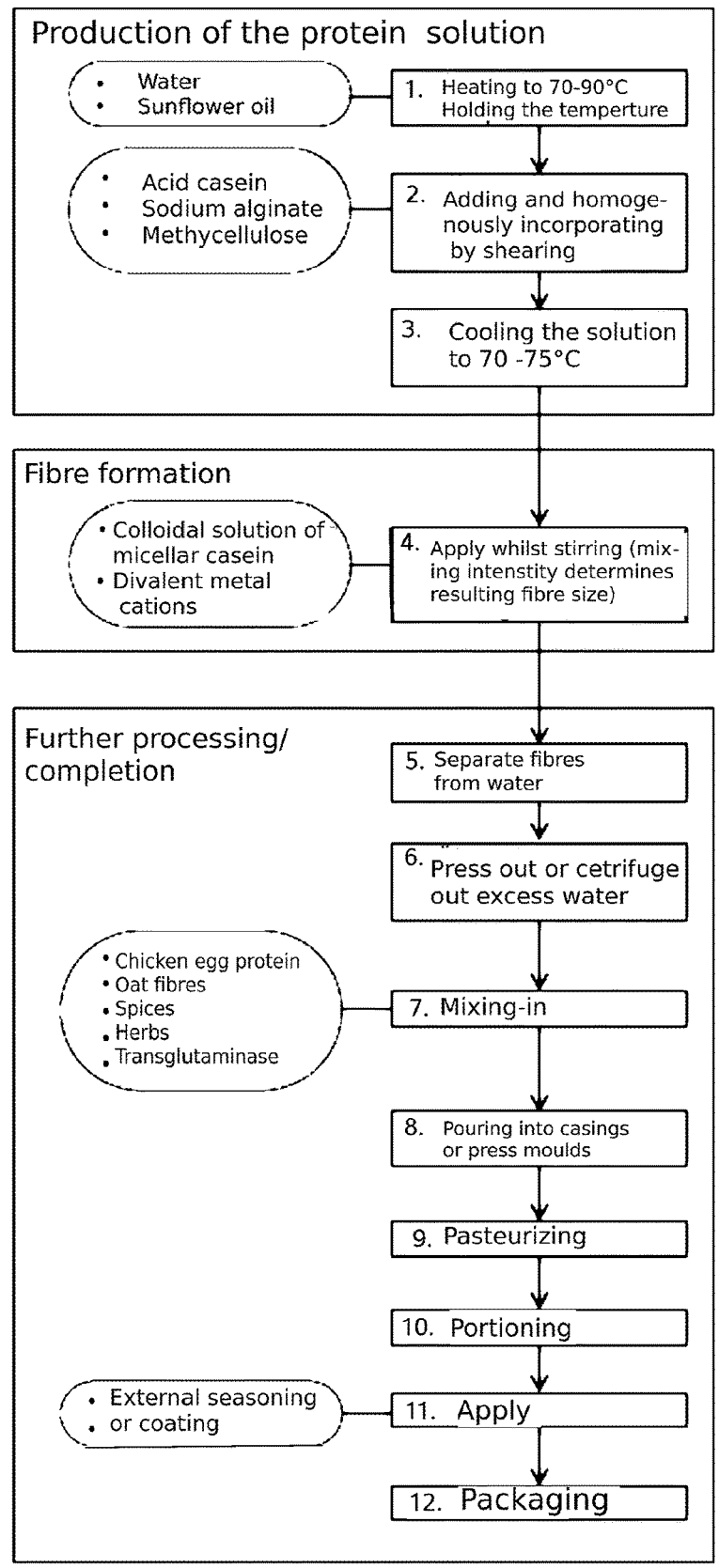

METHOD FOR PRODUCING MEAT SUBSTITUTE PRODUCTS

CROSS REFERENCE TO RELATED APPLICATIONS

This application is a U.S. nationalization under 35 U.S.C. § 371 of International Application No. PCT/EP2013/003420, filed Nov. 13,2013, which claims priority to German Patent Application No. 10 2013 000 955.3, filed Jan. 21, 2013. The disclosures set forth in the reference applications are incorporated herein by reference in their entireties.

The invention relates to a method for producing meat substitute products of the type mentioned in the preamble of claim 1.

Known from U.S. Pat. No. 3,627,536 is a method for producing protein-containing fibres in which a protein-containing aqueous suspension is mixed with a water-soluble alginate salt, and a coagulating agent is gradually added to the mixture whilst stirring, whereby soft fibres are formed which are hardened by adding an acidic coagulation-accelerating agent whilst continuing to stir, whereupon the mixture of solid fibres, coagulating agent and coagulation-accelerating agent is heated in order to coagulate the protein content of the fibres which can be coagulated by heat. Subsequently the fibres are washed with water. The coagulation-accelerating agent is preferably a calcium chloride solution or an acetic acid solution. The protein material in this case is, for example, a soya bean protein, egg white, milk casein or mixtures thereof.

Known from NL-C 108364 is a method for producing meat substitute products in which a homogeneous mixture of non-animal proteins such as, for example, soya, rice, maize and the like is brought into a homogeneous mixture with a hydrocolloid which precipitates with metal ions and this mixture or emulsion is mixed with a solution of a metal cation, for example, of calcium, to form a fibrous product which is then separated from the mixture thus formed.

The application of this method to meat substitute products based on milk proteins encounters problems as a result of the high content of free calcium ions of many milk proteins since premature precipitation occurs in the mixture of proteins with a hydrocolloid which precipitates with metal cations so that, for example according to EP 1467628 B1, an attempt was made to prevent this premature precipitation in a mixture of milk proteins and the hydrocolloid by adding an agent which forms a calcium ion complex before the mixing with the hydrocolloid takes place. The agent forming the calcium ion complex can, for example, be a phosphate material.

As can be seen from EP 1588626 B1, the addition of the agent forming the calcium ion complex can be omitted if the protein material comprises a milk protein material which for example comprises a milk powder, whey protein, alkali metal caseinate and ammonium caseinate, since these starting materials only have a low calcium content. Here it is further specified that the fibre structure or fibre consistence can be influenced by setting the pH.

Further known from EP 0174192 A2 is a method for preparing a milk protein in which an aqueous solution or dispersion of casein and a fraction of an acid polysaccharide with narrow pH values is subjected to a heat treatment. In this case, for example, sodium alginate is used as polysaccharide.

EP 0063728 describes a method for producing a formed food product of microfibrillar milk protein in which an aqueous gel of a milk protein which substantially contains calcium caseinate is mixed with a dehydrating agent and a dispersant and is subjected to a heat treatment. In this case, a fat or oil can be added to the mixture.

Further known from EP 1 790 233 B1 is a method in which an emulsion containing protein and fat is heated and the proteins are thereby denatured. At the same time, a thickener in the form of alginate and in particular sodium alginate is incorporated into the emulsion whilst stirring and subsequently a calcium ion preparing solution is added, for example calcium chloride. However the addition of this precipitation or coagulation agent does not enable any precise control of the desired fibre structure since the coagulation or precipitation takes place very abruptly.

All these known methods therefore have in common that the fibre formation can only be controlled with difficulty and in many cases results in a non-uniform fibre formation.

It is the object of the invention to provide a method of the type mentioned initially in which controllable and uniform fibre formation can be achieved.

This object is solved by the features specified in patent claim 1.

Advantageous embodiments and further developments of the invention are obtained from the subclaims.

The present invention provides a method for forming meat-like fibres from proteins by inclusion of milk proteins and vegetable proteins to produce meat substitute products.

In one embodiment of the method according to the invention, an emulsion is produced from water, a fat and/or oil and a milk protein, preferably acid casein with a suitable combination of hydrocolloids. The combination of hydrocolloids which precipitate with divalent metal cations such as pectin or preferably sodium alginate and hydrocolloids which do not precipitate with divalent metal cations such as, for example, oat fibres, guar gum, starch flour, but preferably methylcellulose makes it possible to control the fibre structure and in particular the strength thereof.

Therefore the removal/binding/complexing of calcium by adding complex-forming substances is not necessary in the present invention since a premature precipitation of the emulsion does not occur when using acid casein which contains virtually no calcium.

In the method according to the invention, instead of the milk protein also or in addition vegetable proteins such as for example, lupine protein, pea protein, potato protein or rape protein can be used.

By adding a colloidal protein mineral solution consisting of micellar casein and a source for divalent metal cations such as calcium chloride or a mixture of sources for divalent metal cations such as calcium chloride and calcium carbonate, fibres are produced which only need to be separated from the aqueous solution.

The fraction of the components providing divalent metal cations such as calcium chloride or a mixture of components providing divalent metal cations such as calcium chloride and calcium carbonate in the colloidal protein mineral solution is preferably selected here so that the fibre formation is not triggered by these components alone but only by the simultaneous addition of micellar casein which has an appreciable fraction of calcium.

Micellar casein contains a large amount of relatively firmly bound calcium which only goes into solution slowly so that the fibre formation takes place slowly.

The addition of colloidally dissolved micellar casein brings about a loosening of the binding points between acid casein and alginate in the already complete emulsion since not all the binding points are bound with pure calcium ions (very tight bonds). Since this reaction takes place simultaneously with the precipitation by means of calcium ions, this results in a significantly more uniform fibre formation. This process is assisted by the resultant slightly acidic pH of the emulsion as a result of the use of acid caseinate. By this means for formation of nests of non-precipitated components can be avoided.

When using acid casein combined with micellar casein for precipitation, the washing process otherwise required can be omitted since the calcium concentration is low and the micellar casein has a taste-masking effect.

The fibre formation and the resulting fibre structure are positively influenced if the temperature of the solution of divalent metal cations during the addition to the emulsion lies significantly below the temperature of the emulsion at 10° C.-60° C.

It was established according to the invention that a suitable mixture/combination of hydrocolloids consisting of alginate and methylcellulose as well as variation of the concentration of divalent metal cations gives very positive fibre structures and positively influences the yield.

It was further established according to the invention that the fibre structure can be influenced by the concentration of the hydrocolloids, preferably methylcellulose in the emulsion and the divalent metal cations required for precipitation.

An increase in the concentration of hydrocolloids, preferably methylcellulose in the emulsion brings about an increase in the yield and gives softer fibres, similar to chicken or fish meat.

Firmer fibres similar to beef are achieved by reducing the concentration of hydrocolloids, preferably methyl cellulose and by increasing the concentration of micellar casein and/or divalent metal cations, preferably calcium chloride and calcium carbonate.

Vegetarian, meat-like fibres of acid casein can be produced by the present invention without adding substances which form a calcium complex. In this case, the fibre corresponds to the structure and strength of meat.

The invention is explained in detail hereinafter with reference to an embodiment of a process sequence depicted in the drawings.

The drawing shows the sequence of an exemplary embodiment of the method according to the invention.

FIRST EXAMPLE

Step 1: 400-450 ml of water at 70-90° C. and 35-50 ml of an animal or vegetable fat or oil are mixed whilst stirring.

Step 2: 25-40 g of acid casein, 1-20 g of sodium alginate and 1-2.5 g of methylcellulose are added and the mass thus formed is processed by shearing to form a stably emulsified emulsion.

Step 3: The mass is optionally cooled to about 70-75° C.

Step 4: Whilst stirring, a colloidal solution of 80-100 ml of water having a temperature significantly lower than the temperature of the mass such as, e.g. 10-30° C., and 2.4-4 g of calcium chloride and 5-8 g of micellar casein are applied to the mass. A uniform fibre formation is initiated, where the resulting fibre size can be influenced by the intensity of the mixing process.

Step 5: After the fibre formation, this is separated from the water and further processed. A washing process is not necessary.

Step 6: Excess water is pressed out or centrifuged out.

In the following steps, the fibres thus formed can be further treated. For the further treatment the fibres can be blended with chicken egg protein, oat fibres, salts, spices and herbs or the fibres are pressed in moulds or poured into casings and pasteurized. Furthermore, the product can be portioned, external seasoning applied or coated with breadcrumbs and then packaged.

Butter fat or sunflower oil or any other animal or vegetable fat/oil can be used as fat. The protein can be a milk protein such as acid casein (90% protein content, 0.1% calcium content, 10% water content). Instead of methylcellulose, for example oat fibres or starch flour can also be used.

SECOND EXAMPLE

The protein according to the first example is replaced by vegetable proteins such as, e.g. soya protein, lupine protein, pea protein, potato protein or rape protein and otherwise the method proceeds according to the first example.

By adding methylcellulose to the emulsion, a better control of the fibre structure is made possible.

The fibre formation and the resulting fibre structure are furthermore positively influenced if the temperature of the solution of divalent metal cations at 10-60° C. lies significantly below the temperature of the emulsion during addition to the emulsion.

A suitable mixture/combination of hydrocolloids consisting of alginate and methylcellulose as well as variation of the concentration of divalent metal cations makes it possible to achieve very positive fibre structures depending on the starting materials, and positively influences the yield. An increase in the concentration of methyl cellulose in the emulsion brings about an increase in the fibre yield and thus gives softer fibres, similar to chicken or fish meat, whereas a reduction in the concentration of methylcellulose in the emulsion and an increase in the divalent metal cations in the solution brings about firmed fibres similar to beef.

The method according to the invention enables meat-free products to be produced in all formats such as hamburgers, schnitzels, balls, sausage and fried sausage for boiling, heating, frying or grilling.

Furthermore, it is also possible to produce hamburger products, marinated or non-marinated, fibres pressed into shape which, supplied as meat substitute ready packaged or individually, can be fried or grilled, and schnitzels, marinated, coated with breadcrumbs or seasoned, fibres pressed into shape, which, supplied as meat substitute ready packaged or individually, can be fried or grilled. Fillings with, for example, cheese, balls, strips or cubes are also possible. Fibres pressed into shape, which are part of ready meals or individually as minced meat, shredded meat or goulash cubes, sausage and fried sausage are also feasible. Finely minced fibres which, when poured into casings, in the form of vegetarian sausage can be used as part of ready meals or in individual applications.

The invention thus makes it possible to develop finished products with a new type of texture and shape with and without filling. The invention also makes it possible to lower production costs.

The starting materials of the method can be provided in powder or granule form so that merely the addition of water is required at the application site.

The invention claimed is:

1. A method for producing meat substitute products comprising:
   1) processing a) a mixture of water and a vegetable fat or oil; b) a protein; c) sodium alginate; and d) methylcellulose by shearing to form a stable emulsion, wherein the protein is acid casein or a vegetable protein(s); and 2) adding to the stable emulsion a colloidal solution to initiate fiber formation, wherein the colloidal solution comprises a) divalent metal cations; and b) micellar casein, wherein the source for the divalent metal cations is calcium chloride and/or calcium carbonate, wherein the micellar casein comprises a calcium fraction, and wherein the quantity of added divalent metal cations is not sufficient to initiate fiber formation alone but is selected so that it only leads to the initiation of fiber formation in combination with the calcium fraction of the micellar casein.

2. The method according to claim 1 wherein the mixture of water and a vegetable oil is heated to a temperature of 70° to 90° C.

3. The method according to claim 1 wherein the colloidal solution of divalent metal cations and micellar casein is held at a temperature of 10° C. to 60° C. before addition.

4. The method according to claim 1 wherein the fibre yield is increased by increasing the concentration of methylcellulose to the emulsion.

5. The method according to claim 4, wherein a reduction in the strength of the fibres is brought about by an increase in the concentration of methylcellulose in the emulsion.

6. The method according to claim 1 wherein an increase in the strength of the fibres is brought about by a reduction in the concentration of methylcellulose in the emulsion and/or an increase in the concentration of micellar casein and/or the divalent metal cations.

7. The method according to claim 1, wherein the vegetable protein is lupine protein, pea protein, potato protein or rape protein.

* * * * *

UNITED STATES PATENT AND TRADEMARK OFFICE
CERTIFICATE OF CORRECTION

PATENT NO. : 10,327,457 B2  
APPLICATION NO. : 14/762134  
DATED : June 25, 2019  
INVENTOR(S) : Mehran Rose, Andreas Gebhart and Wolfgang Moser Page 1 of 1

It is certified that error appears in the above-identified patent and that said Letters Patent is hereby corrected as shown below:

On the Title Page

Item (73), Assignee, please delete "ROVITA GMBH" and insert -- PULSE-TEX GMBH -- therefor.

Signed and Sealed this  
Seventeenth Day of September, 2019

Andrei Iancu  
*Director of the United States Patent and Trademark Office*